(No Model.)
J. C. BAUER.
LATHE CHUCK.
No. 330,867. Patented Nov. 24, 1885.
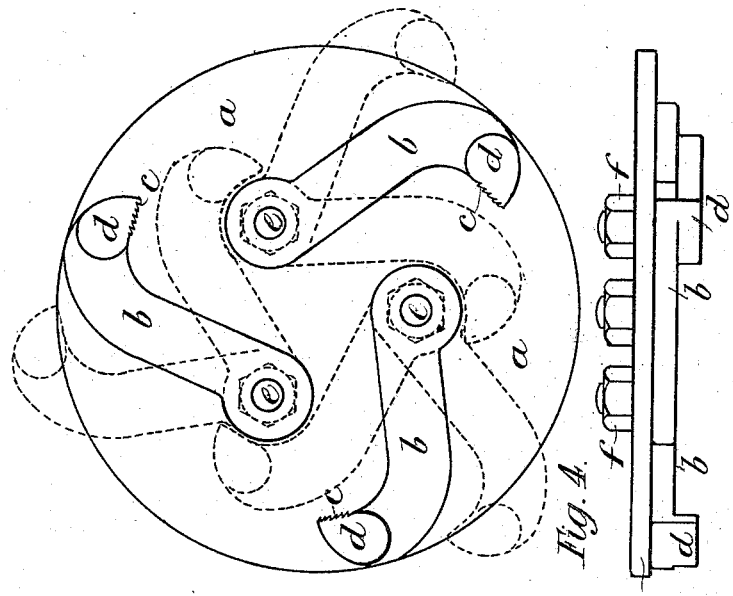
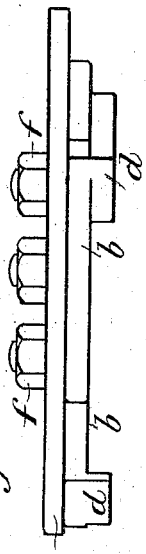
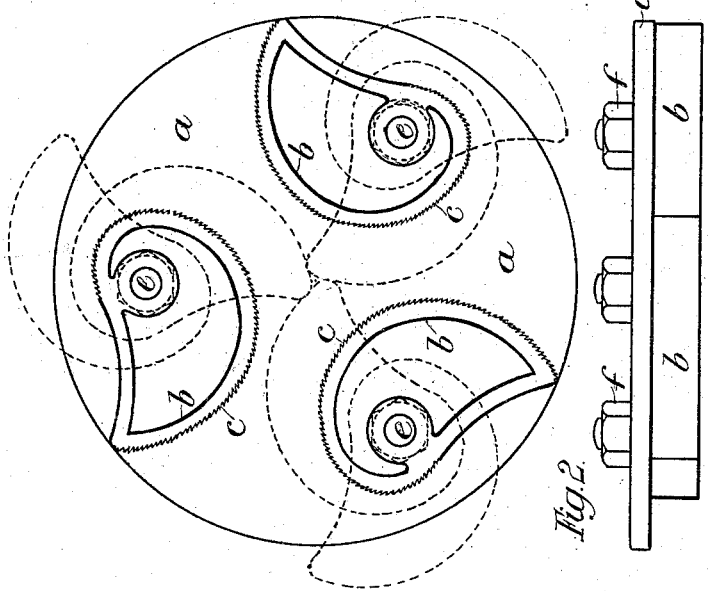
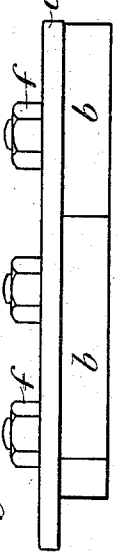
Witnesses
Inventor.

UNITED STATES PATENT OFFICE.

JOHN C. BAUER, OF BROCKLEY, COUNTY OF KENT, ENGLAND.

LATHE-CHUCK.

SPECIFICATION forming part of Letters Patent No. 330,867, dated November 24, 1885.

Application filed March 31, 1885. Serial No. 160,819. (No model.) Patented in England September 8, 1884, No. 12,149; in France March 3, 1885, No. 167,408; in Germany March 3, 1885, No. 32,802; in Belgium March 5, 1885, No. 68,099, and in Austria-Hungary July 22, 1885, No. 15,099 and No. 38,492.

*To all whom it may concern:*

Be it known that I, JOHN CHARLES BAUER, a subject of the Queen of Great Britain, residing at Brockley, in the county of Kent, England, have invented new and useful Improvements in Lathe-Chucks, of which the following is a specification.

This invention relates to improvements in lathe-chucks.

In carrying out my invention I employ three or more suitably-shaped cams or eccentrically-placed arms provided with cams having roughened edges and turning on pivots fixed to a face-plate or to the like part of a lathe in such a manner that when the article to be turned or bored is placed between the said cams or arms and each of them is brought into contact therewith by being simply turned on its pivot the said article is firmly held in its position by them when the lathe is worked, without having to use adjusting-screws, sliding jaws, or other more complicated means of holding the same, the rotation of the chuck in the lathe causing the jaws of the cams or eccentric arms to close tightly on the article held in the chuck.

In order to enable my invention to be fully understood, I will proceed to describe the same by reference to the accompanying drawings, in which—

Figure 1 is a front elevation, and Fig. 2 a plan, of a lathe-chuck constructed according to my invention when cams are employed; and Figs. 3 and 4 are similar views to Figs. 1 and 2, but showing the lathe-chuck formed with eccentrically-placed arms having cams.

Similar letters in all the figures represent similar parts.

*a* is a face-plate, and *b b b* in Figs. 1 and 2 represent the cams, and in Figs. 3 and 4 the eccentrically-placed arms carrying cams *d*.

*c c c* show the roughened edges of the cams. These cams *d* in Figs. 3 and 4 form claws or projections, as shown.

*e e* are the pivots on which the cams or arms *b* turn. By turning the cams or eccentrically-placed arms *b* the serrated or roughened edges *c* thereof can be brought nearer to or farther from the center of the face-plate *a*, as illustrated by the dotted lines in Figs. 1 and 3, so as to allow of articles of various sizes being held by the chuck.

*f f* are screw-nuts on the pivots *e e*, to allow of clamping the cams or arms.

By this construction of chuck it will be obvious that to fix an article in the chuck it is merely necessary to turn the cams or arms *b b* on their pivots and then to place the article in the center, and on turning the cams or arms inwardly they will firmly hold the article, and the rotation of the lathe in the direction for turning will keep the cams or arms gripped against the article; or the cams or arms may be clamped in position by means of their nuts. When the article is released, the cams or arms are at once completely free to swing or move back out of engagement with the article without any obstruction from springs, slides, screws, or kindred devices.

Lathe-chucks have been made with adjusting-screws and with sliding jaws and with springs, and also with a series of cams operated by a toothed ring and pinions engaging with such ring. Such appliances I do not use, and therefore disclaim.

Having now particularly described and ascertained the nature of my invention and in what manner the same is to be performed, I declare that what I claim is—

The described lathe-chuck, consisting of the following devices in combination, namely: the face-plate *a*, the series of eccentrically-placed lever-arms *b*, each having a projecting claw, *d*, roughened on its inner edge, *c*, the pivots *e*, and clamping-screws *f*, the construction permitting the free movement of the arms on their centers to grip or to release the article to be held, and also permitting the clamping of the arms in the desired position.

J. C. BAUER.

Witnesses:
G. F. REDFERN,
A. ALBUTT.